（12）United States Patent
Kampl et al.

(10) Patent No.: US 11,967,929 B2
(45) Date of Patent: Apr. 23, 2024

(54) METHOD FOR OPERATING A PHOTOVOLTAIC SYSTEM

(71) Applicant: Fronius International GmbH, Pettenbach (AT)

(72) Inventors: Tobias Kampl, Pettenbach (AT); David Hanek, Pettenbach (AT); Franz Breitwieser, Pettenbach (AT); Jürgen Waldhör, Pettenbach (AT); Martin Wolf, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 111 days.

(21) Appl. No.: 17/756,577

(22) PCT Filed: Feb. 3, 2021

(86) PCT No.: PCT/EP2021/052478
§ 371 (c)(1),
(2) Date: May 27, 2022

(87) PCT Pub. No.: WO2021/165038
PCT Pub. Date: Aug. 26, 2021

(65) Prior Publication Data
US 2023/0006604 A1    Jan. 5, 2023

(30) Foreign Application Priority Data
Feb. 20, 2020    (EP) ..................... 20158530

(51) Int. Cl.
*H02S 50/00* (2014.01)
*H02J 3/38* (2006.01)

(52) U.S. Cl.
CPC ............. *H02S 50/00* (2013.01); *H02J 3/381* (2013.01); *H02J 2300/24* (2020.01); *Y02E 10/50* (2013.01); *Y02E 10/56* (2013.01)

(58) Field of Classification Search
CPC .......... H02J 3/381; H02J 7/35; H02J 2300/24; Y02E 10/50; Y02E 10/56; Y02E 70/30; Y02B 10/70; Y04S 10/123
See application file for complete search history.

(56) References Cited

U.S. PATENT DOCUMENTS

| | | | |
|---|---|---|---|
| 2012/0047386 A1* | 2/2012 | Matsui | H02J 3/46 713/340 |
| 2016/0329721 A1 | 11/2016 | Rogers | |
| 2017/0331293 A1* | 11/2017 | Narla | H02J 3/381 |

OTHER PUBLICATIONS

International Search Report corresponding to International Patent Application No. PCT/EP2021/052478, dated Feb. 17, 2021 (3 pages).

* cited by examiner

*Primary Examiner* — Ryan Johnson
(74) *Attorney, Agent, or Firm* — Maginot, Moore & Beck, LLP

(57) ABSTRACT

A photovoltaic system comprising an inverter adapted to convert a DC power supplied by photovoltaic modules of a photovoltaic generator via power cables to said inverter into an AC current for an AC power supply grid, wherein the inverter has a base station connected by means of the power cables to the module level devices which are provided to monitor and/or to control associated photovoltaic modules of the photovoltaic generator, wherein if the inverter does not receive sufficient energy from the photovoltaic generator and the AC power supply grid, a controller is adapted to activate a deadlock prevention mode of an energy supply unit connected to the inverter where the inverter receives energy from the energy supply unit such that the base station of the inverter is able to continue to transmit permission to operate, PTO, signals via the power cables to the module level devices of the photovoltaic generator.

17 Claims, 4 Drawing Sheets

METHOD FOR OPERATING A PHOTOVOLTAIC SYSTEM

PRIORITY CLAIM

This application is a 35 U.S.C. § 371 National Stage Application of PCT/EP2021/052478, filed on Feb. 3, 2021, which claims the benefit of priority to Serial No. 20158530.4, filed on Feb. 20, 2020, in Europe, the disclosures of which are incorporated herein by reference in their entirety.

BACKGROUND

US 2016/329721 A1 describes a device for controlling power exported from a renewable energy source to a utility grid. The device comprises a means for monitoring the direction of flow of power within the renewable energy source, a means for isolating the flow of power from the renewable energy source to the mains power supply. When a reverse power flow is sensed between the renewable energy source and the mains power supply, the monitoring means signals the isolating means to limit the renewable energy source to the mains power supply.

A photovoltaic system can comprise one or more photovoltaic strings or photovoltaic modules within a photovoltaic array. A photovoltaic array having one or more photovoltaic strings forms a photovoltaic generator and can be connected via a DC line to an inverter of the photovoltaic system. The inverter is adapted to convert a DC current received from the photovoltaic generator into an AC current and supply it to an AC power supply grid.

For a photovoltaic system, powerline communication PLC can be used to transmit data over existing power cables. PLC is used to communicate keep-alive signals to control a rapid shutdown RSD of a photovoltaic array at a photovoltaic modular level. For instance, certain standards and regulations require the keep-alive signal to be transmitted from the inverter to one or more module level devices of a photovoltaic generator at all time, i.e. continuously.

The inverter of the photovoltaic system transmits keep-alive signals, in particular, permission to operate PTO signals to the module level devices MLDs of the photovoltaic generator. The inverter of the photovoltaic system comprises a base station having a transmitter which is capable of transmitting keep-alive signals to the module level devices MLDs of the photovoltaic generator. The base station can draw electrical energy from the photovoltaic generator, the AC power supply grid and/or a local energy supply unit to transmit the keep-alive signals to the module level devices MLDs of the photovoltaic generator.

However, in a situation where the inverter does not receive any energy from the AC power supply grid, the photovoltaic generator and the energy supply unit, the inverter is no longer able to transmit the keep-alive signals to the module level devices MLDs of the photovoltaic generator. This causes the module level devices MLDs of the photovoltaic generator to shutdown. If in such a situation, sufficient energy is later available at the photovoltaic generator to switch on the module level devices MLDs, then the inverter will not be able to transmit the necessary keep-alive signals. This is because the inverter may no longer be able to receive energy from the photovoltaic generator as both the AC power supply grid and the energy supply unit are already disconnected. This creates an unwanted deadlock situation where the inverter of the photovoltaic system is not able to transmit the required keep-alive signals even when sufficient energy is available at the photovoltaic generator of the photovoltaic system.

SUMMARY OF THE DISCLOSURE

Accordingly, it is an object of the present invention to provide a photovoltaic system where such a deadlock situation is avoided and a continuous operation of the photovoltaic system is guaranteed.

This object is achieved by a photovoltaic system and a method for operating a photovoltaic system comprising the features of the independent claims. Further advantageous embodiments are subject-matter of the dependent claims.

The invention provides according to the first aspect of the present invention a photovoltaic system comprising an inverter adapted to convert a DC power supplied by photovoltaic modules of a photovoltaic generator via power cables to said inverter into an AC current for an AC power supply grid, wherein the inverter has a base station connected by means of the power cables to the module level devices which are provided to monitor and/or to control associated photovoltaic modules of the photovoltaic generator, wherein if the inverter does not receive sufficient energy from the photovoltaic generator and the AC power supply grid, a controller of the photovoltaic system is adapted to activate a deadlock prevention mode of an energy supply unit connected to the inverter where the inverter receives energy from the energy supply unit such that the base station of the inverter is capable to continue to transmit permission to operate (PTO) signals via the power cables to the module level devices of the photovoltaic generator.

In the photovoltaic system according to the first aspect of the present invention, a specific deadlock prevention mode is provided to control the state of charge of the energy supply unit such that always sufficient energy is available for the inverter of the photovoltaic system to transmit keep-alive signals to the module level devices during a possible deadlock situation.

The energy supply unit of the photovoltaic system can be switched by the controller into different operation modes.

In a possible embodiment of the photovoltaic system according to the first aspect of the present invention, the controller is integrated into the inverter.

In a possible embodiment of the photovoltaic system a first operation mode of the energy supply unit comprises a normal operation mode where the energy supply unit is configured to supply energy to a load network of the photovoltaic system and to receive energy from the photovoltaic generator and/or from the AC power supply grid to maintain the state of charge SoC of the energy supply unit above a first SoC level L1.

In a further possible embodiment of the photovoltaic system according to the first aspect of the present invention, the energy supply unit comprises as a further operation mode a backup operation mode where the energy supply unit is configured to supply energy to the load network via the inverter when the state of charge SoC of the energy supply unit falls below the first SOC level L1. In the backup operation mode, the energy supply unit is configured to supply energy to the load network of the photovoltaic system 1 until the SoC of the energy supply unit reaches a second SoC level, L2, when the AC power supply grid is disconnected.

In a further possible embodiment of the photovoltaic system according to the first aspect of the present invention, the energy supply unit comprises as a further operation mode a deadlock prevention mode where the energy supply unit is configured to exclusively supply the inverter with energy when the state of charge SoC of the energy supply unit falls below a second SoC level L2 and no energy from the AC power supply grid is available.

In a further possible embodiment of the photovoltaic system according to the first aspect of the present invention, the energy supply unit comprises as a further operation mode a standby operation mode where the inverter is no longer supplied with energy by the energy supply unit when the state of charge SoC of the energy supply unit falls below a predefined third minimal SoC level L3 and no energy from the AC power supply grid is available.

In a possible embodiment of the photovoltaic system according to the first aspect of the present invention, the energy supply unit of the photovoltaic system is configured to exclusively supply the inverter with energy in the deadlock prevention mode of the energy supply unit if the inverter does not receive energy from the photovoltaic generator and the AC power supply grid for a predefined period of time.

In a possible embodiment, the period of time can be configured and stored in a register of the controller.

In this embodiment, the period of time can be adjusted according to a use case of the photovoltaic system. This provides for more flexibility of the photovoltaic system according to the first aspect of the present invention.

In a further possible embodiment of the photovoltaic system according to the first aspect of the present invention, the energy supply unit of the photovoltaic system is configured to supply exclusively the inverter of the photovoltaic system with energy in the deadlock prevention mode of the energy supply unit if the inverter does not receive a predefined amount of energy from the photovoltaic generator and the AC power supply grid.

In a possible embodiment, the predefined amount of energy can also be stored in an associated configuration register of the controller. Accordingly, also in this embodiment, the amount of energy can be adapted to the corresponding use case.

In a further possible embodiment of the photovoltaic system according to the first aspect of the present invention, in the standby operation mode of the energy supply unit where the inverter of the photovoltaic system is no longer supplied with energy from the energy supply unit, the inverter is automatically turned off.

In a further possible embodiment of the photovoltaic system according to the first aspect of the present invention, a SoC warning signal is triggered automatically by the controller when the state of charge SoC of the energy supply unit reaches a predetermined level above each of the predefined SoC levels, L1, L2 or L3. The predetermined level is a SoC level of the energy supply unit.

In a possible embodiment, the predetermined level is a same percentage of SoC above each SoC levels, L1, L2 and L3.

In a possible embodiment, the predetermined level corresponding to each of the SoC levels, L1, L2 and L3 is different.

In a possible embodiment, the predetermined level for each SoC levels, L1, L2 and L3 is equal to the corresponding SoC levels, L1, L2 and L3.

The predetermined SoC level for each of the SoC levels L1, L2, L3 of the energy supply unit used for issuing the warning signal are stored in corresponding configuration registers of the controller.

For instance, since the warning signal for the SoC level L3 is provided at the predetermined level above L3, this allows to take emergency measures to avoid a turnoff of the inverter.

In a further possible embodiment of the photovoltaic system according to the first aspect of the present invention, the controller comprises a first interface to receive information about the current operation mode of the energy supply unit and about operation parameters including the state of charge SoC of the energy supply unit and/or a switching state of an energy supply unit switch which is provided to connect the energy supply unit to the inverter.

In a still further possible embodiment of the photovoltaic system according to the first aspect of the present invention, the controller comprises a second interface to receive information about the current state of the AC power supply grid including the switching state of a grid switch which is provided to connect the AC output of the inverter with the AC power supply grid.

In a further possible embodiment of the photovoltaic system according to the first aspect of the present invention, the SoC levels L1, L2, L3 of the energy supply unit used for controlling the operation modes of the energy supply unit are stored in corresponding configuration registers of the controller.

In a further possible embodiment of the photovoltaic system according to the first aspect of the present invention, the first SoC level L1 and the second SoC level L2 are adjustable by means of a user interface of the photovoltaic system.

In a further possible embodiment of the photovoltaic system according to the first aspect of the present invention, the third SoC level L3 is predefined according to the specification of the energy supply unit manufacturer.

In a further possible embodiment of the photovoltaic system according to the first aspect of the present invention, the second SoC level L2 is adjusted to cover a standby energy consumption of the inverter including its base station for a predefined time period to prevent that the state of charge SoC of the energy supply unit falls to the predefined minimum third SoC level L3.

In a possible embodiment of the photovoltaic system according to the first aspect of the present invention, the energy supply unit is connected to the inverter via an energy supply unit switch, wherein the energy supply unit switch is an integral part of the energy supply unit.

In a possible embodiment of the photovoltaic system according to the first aspect of the present invention, the energy supply unit is connected to the inverter via an energy supply unit switch, wherein the energy supply unit switch is external to the energy supply unit.

The invention provides according to the second aspect a method for operating a photovoltaic system comprising an inverter which converts a DC power supplied by photovoltaic modules of a photovoltaic generator via power cables to the inverter into an AC current supplied to an AC power supply grid, wherein the inverter has a base station connected by means of power cables to the module level devices of the photovoltaic generator which monitor and/or control associated photovoltaic modules of the photovoltaic generator, wherein if the inverter does not receive sufficient energy from the photovoltaic generator and the AC power supply grid, a controller activates a deadlock prevention mode of an energy supply unit connected to the inverter where the inverter receives energy from the energy supply unit such that the base station of the inverter is capable to continue to transmit permission to operate signals via the power cables to the module level devices of the photovoltaic.

In a possible embodiment of the method according to the second aspect of the present invention, the energy supply unit supplies the inverter exclusively with energy in the deadlock prevention mode of the energy supply unit if the inverter does not receive energy from the photovoltaic generator and the AC power supply grid for a predefined period of time.

In a further possible embodiment of the method according to the second aspect of the present invention, the energy supply unit supplies the inverter exclusively with energy in the deadlock prevention mode of the energy supply unit if the inverter does not receive a predefined amount of energy from the photovoltaic generator and the AC power supply grid.

In a further possible embodiment of the method according to the second aspect of the present invention, a SoC warning signal is automatically triggered by the controller when the state of charge SoC of the energy supply unit falls to a predetermined level corresponding to each of the SoC levels L1, L2 and L3.

DESCRIPTION OF THE DRAWINGS

In the following, possible embodiments of the different aspects of the present invention are described in more detail with reference to the enclosed figures.

DETAILED DESCRIPTION

Figure 1:
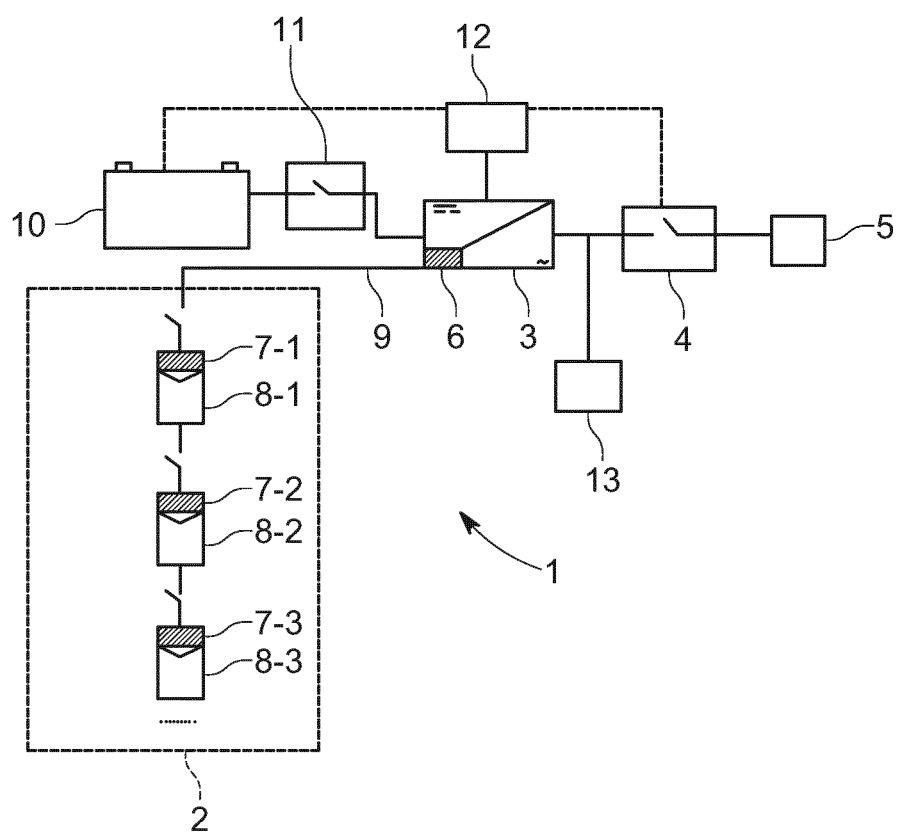
FIG. 1 shows a block diagram to illustrate a possible exemplary embodiment of a photovoltaic system according to the first aspect of the present invention.

FIG. 1 shows schematically a block diagram of a possible exemplary embodiment of a photovoltaic system 1 according to the first aspect of the present invention. In the illustrated exemplary embodiment, a photovoltaic generator 2 is connected to an inverter 3 of the photovoltaic system 1. The inverter 3 is adapted to convert a received DC power supplied by photovoltaic modules 8 of the photovoltaic generator 2 via power cables 9 to the inverter 3 into an AC current for an AC power supply grid 5.

The inverter 3 comprises a DC input side and an AC output side. The AC output of the inverter 3 is connected in the illustrated embodiment via a grid switch 4 to the AC power supply grid 5. The inverter 3 comprises in the illustrated embodiment a base station 6 which is connected by means of power cables 9 to module level devices 7 which are provided to monitor and/or to control associated photovoltaic modules 8 of the photovoltaic generator 2.

Figure 2:
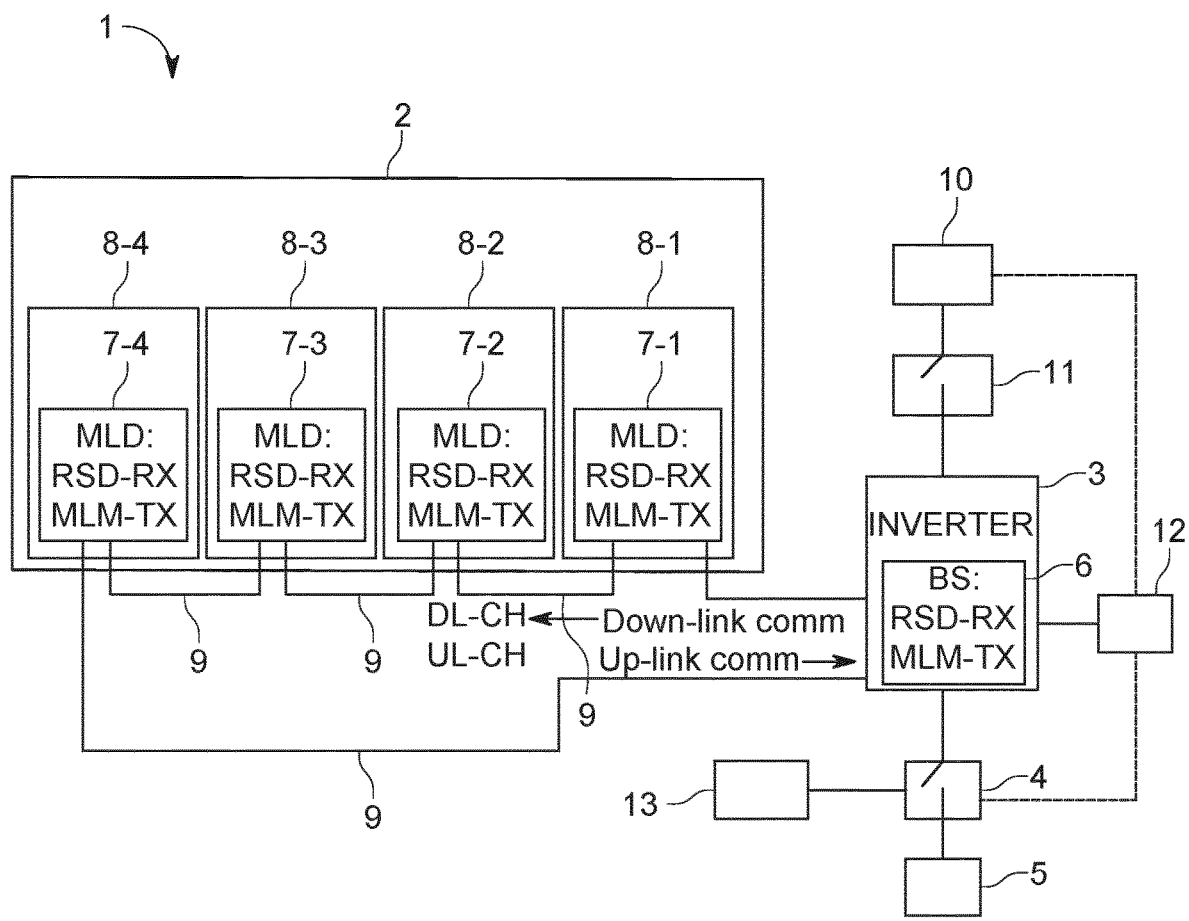
FIG. 2 shows a further block diagram for illustrating a possible exemplary embodiment of a photovoltaic system according to the first aspect of the present invention.

In a preferred embodiment, the photovoltaic modules 8 are connected to the base station 6 of the inverter 3 via power cables 9 in a loop as illustrated in the embodiment of FIG. 2. The base station 6 comprises a transmitter adapted to transmit continuously permission to operate (PTO) signals via the power cables 9 to receivers integrated in the module level devices 7 of the photovoltaic generator 2.

As illustrated in FIG. 1, the inverter 3 is connected at its DC input side to an energy supply unit 10 of the photovoltaic system 1. In a possible embodiment, the energy supply unit 10 is connected to the inverter 3 via an energy supply unit switch 11 as illustrated in FIG. 1.

The photovoltaic system 1 comprises in the illustrated embodiment a controller 12 which can be connected to the inverter 3 via an interface. In an alternative embodiment, the controller 12 can also be integrated in the inverter 3. If the inverter 3 does not receive sufficient energy from the photovoltaic generator 2 and from the AC power supply grid 5, the controller 12 of the photovoltaic system 1 is adapted to activate a deadlock prevention mode of the energy supply unit 10 connected to the inverter 3.

In the deadlock prevention mode, the inverter 3 receives energy from the energy supply unit 10 so that the transmitter of the base station 6 of the inverter 3 is capable of continuing to transmit permission to operate signals, i.e. keep-alive signals, via the power cables 9 to the module level devices 7 of the photovoltaic generator 2. The energy supply unit 10 of the photovoltaic system 1 can be used to supply a local load network 13 with energy via the inverter 3.

The controller 12 of the photovoltaic system 1 comprises an interface adapted to receive information about the current operation mode of the energy supply unit 10. The controller 12 can also get information about operation parameters of the energy supply unit 10 including the state of charge SoC of the energy supply unit 10 via that interface.

As illustrated in FIG. 1, the energy supply unit 10 comprises an energy supply unit separation switch 11 which separates the energy supply unit 10 from the inverter in a failure scenario, e.g. when the communication between the inverter 3 and/or its controller 12 and the energy supply unit 10 is interrupted. The controller 12 can also monitor the switching state of the energy supply unit switch 11 to connect or disconnect the energy supply unit 10 from the DC input side of the inverter 3.

The controller 12 can further comprise a second interface to receive information about the current state of the AC power supply grid 5 including the switching state of the grid switch 4. The grid switch 4 can be used to separate the photovoltaic system 1 from the power supply grid 5 when a failure situation arises. The grid switch 4 can be controlled in a possible implementation by the local controller 12 of the photovoltaic system 1. In an alternative embodiment, the grid switch 4 can be controlled by a remote controller of an operator of the AC power supply grid 5. In case, the AC power supply grid 5 fails, the grid switch 4 can be switched to separate the inverter 3 from the AC power supply grid 5 so that the loads can be supplied with energy in a backup power mode. In the illustrated embodiment of FIG. 1, the photovoltaic generator 2 is equipped with a module deactivation entity.

A permission to operate PTO signal is continuously transmitted by the transmitter of the base station 6 of the inverter 3 to the different module level devices 7 of the photovoltaic generator 2. As long as the receivers integrated in the module level devices 7 receive a permission to operate PTO signal from the transmitter of the base station 6 of the inverter 3 via the power cables 9, the associated photovoltaic modules 8-$i$ are not deactivated. Accordingly, an interruption in the continuous transmission of permission of the PTO signals due to insufficient energy at the base station 6 of the inverter 3 is avoided, thereby preventing an unwanted deadlock situation.

During daytime, the photovoltaic generator 2 provides sufficient energy which can also be used by the base station 6 of the inverter 3 to generate and provide permission to operate PTO signals. However, during nighttime, the photovoltaic generator 2 does not generate photovoltaic energy. Accordingly, in a situation where the AC power supply grid 5 is disconnected from the inverter 3 due to the grid switch 4 and during a situation where the photovoltaic generator 2 does not generate energy, the power supply of the inverter 3 and its integrated components such as the base station 6 depends on the local energy supply unit 10 of the photovoltaic system 1.

If the photovoltaic generator 2 does not provide sufficient energy due to unavailability or a low level of solar irradiance, the module level devices 7-$i$ and the integrated receivers may not receive sufficient energy. In such a situation, if the energy supply unit 10 reaches a minimal state of charge SoC, the energy supply unit 10 may not be able to provide sufficient energy and is switched by the controller 12 of the inverter 3 into a standby operation mode. Further, the energy supply unit switch 11 is opened to separate the energy supply unit 10 from the inverter 3.

In such a situation, in a conventional photovoltaic system 1, although if sufficient energy is again available at the photovoltaic modules 8 of the photovoltaic generator 2 to activate the module level devices 7, the inverter 3 with its integrated base stations 6 cannot transmit powerline communication PLC control signal since the energy supply unit 10 and the AC power supply grid 5 are disconnected.

Figure 3:
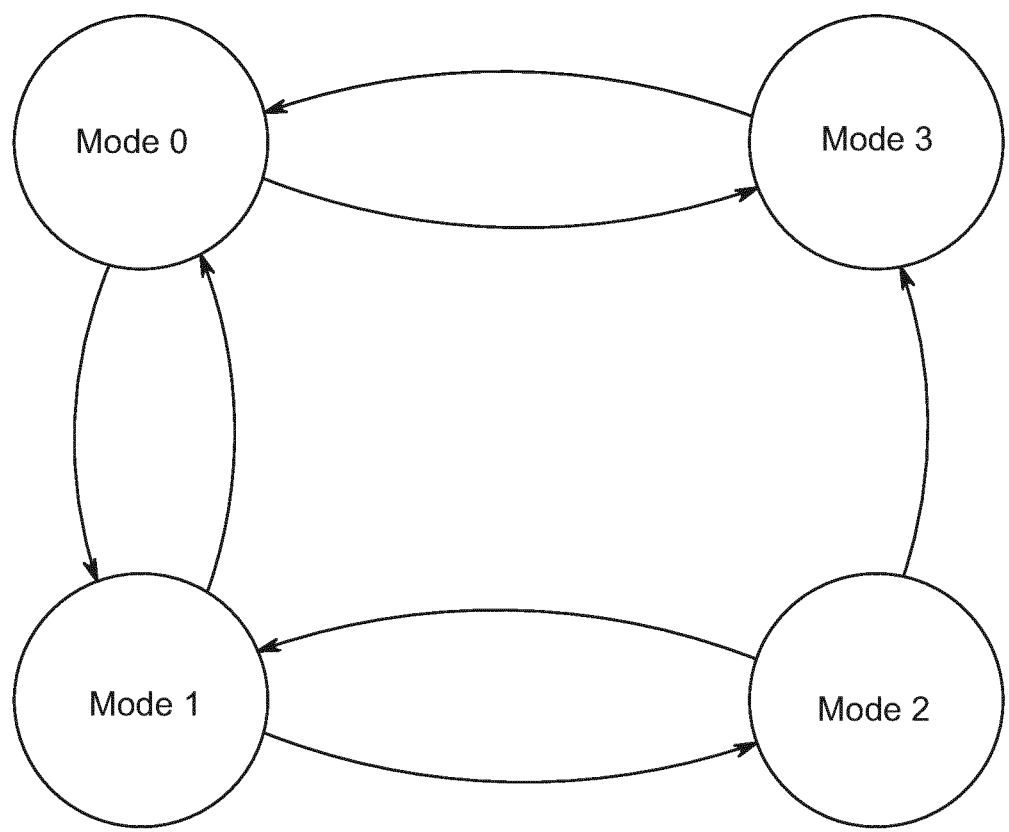
FIG. 3 shows a state diagram for illustrating an operation of a possible embodiment of a photovoltaic system according to the first aspect of the present invention.
Figure 4:
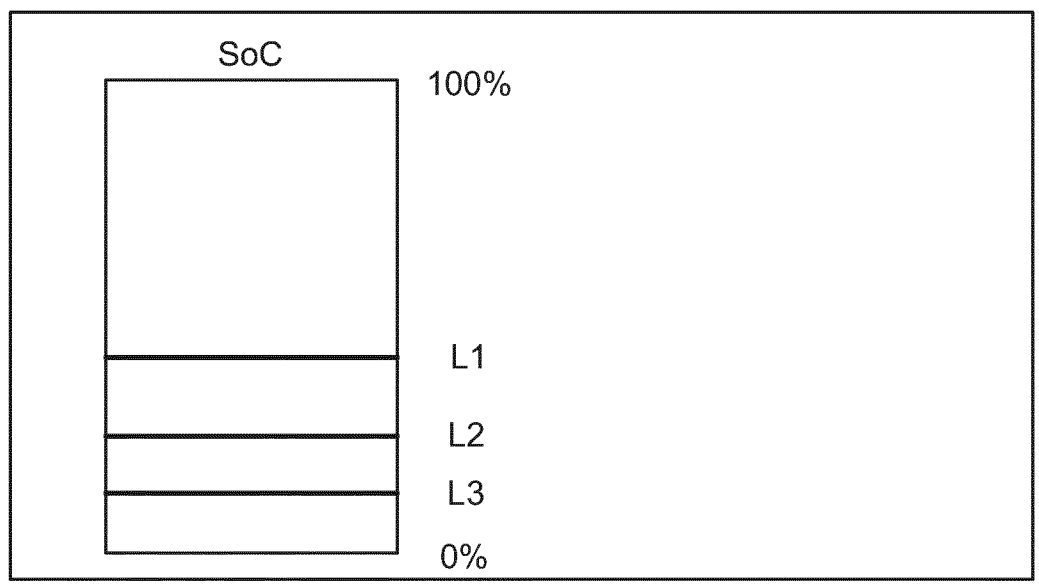
FIG. 4 shows a diagram for illustrating different SoC levels L of an energy supply unit used for controlling the operation of a photovoltaic system according to the first aspect of the present invention.

In the photovoltaic system 1 as illustrated in the embodiment of FIG. 1, the energy supply unit 10 can be switched by the controller 12 between four different operation modes. The energy supply unit 10 comprises a normal operation mode, a backup operation mode, a deadlock prevention mode and a standby operation mode as also illustrated in the state diagram of FIG. 3. FIG. 4 illustrates different state of charge SoC levels (L1, L2 and L3) for the energy supply unit 10 of the photovoltaic system 1 shown in FIG. 1. Any number of operating modes may be defined and the present invention is not intended to be limited to any specific set of operating modes.

In the normal operation mode (Mode 0), the energy supply unit 10 is configured to supply energy to the load network 13 of the photovoltaic system 1 and to receive energy from the photovoltaic generator 2 and/or from the AC power supply grid 5 to maintain its state of charge SoC above a first SoC level L1.

In a backup operation mode (Mode 1), the energy supply unit 10 is configured to supply energy to the load network 13 via the inverter 3 when the state of charge SoC of the energy supply unit 10 falls below the first SoC level L1.

In the deadlock prevention mode (Mode 2) of the energy supply unit 10, the energy supply unit 10 is configured to exclusively supply the inverter 3 with energy when the state of charge SoC of the energy supply unit 10 falls below a second SoC level L2 and no energy from the AC power supply grid 5 is available.

In the standby operation mode (Mode 3) of the energy supply unit 10, the inverter 3 is no longer supplied with energy from the energy supply unit 10 when the state of charge SoC of the energy supply unit 10 falls below a predefined third minimum SoC level L3 and no energy from the AC power supply grid 5 is available.

When the AC power supply grid 5 is disconnected from the inverter 3, the energy supply unit 10 is switched by the controller 12 from the normal operation mode to the backup operation mode.

When the energy supply unit 10 is charged either from the photovoltaic generator 2 or the AC power supply grid 5 to a level above SoC level L1 (as shown in FIG. 4), then the energy supply unit 10 is switched by the controller 12 from the backup operation mode to the normal operation mode. In other words, when the AC power supply grid 5 is again connected back to the inverter 3, the energy supply unit 10 is switched by the controller 12 from the backup operation mode to the normal operation mode.

When the state of charge SoC of the energy supply unit 10 falls below the second SoC level L2 and no energy is available from the AC power supply grid 5, the controller 12 switches the energy supply unit 10 from the backup operation mode into the deadlock prevention mode where the energy supply unit 10 is configured to exclusively supply the inverter 3 with electrical energy.

When the energy supply unit 10 is charged by the photovoltaic generator 2 to the SoC level L1, then the energy supply unit 10 is switched by the controller 12 from the deadlock prevention mode to the backup operation mode. In this case, since the AC power supply grid 5 is unavailable, the AC power supply grid 5 cannot be used to charge the energy supply unit 10.

In case, when the energy supply unit 10 further discharges to the SoC level L3, then the energy supply unit 10 is switched by the controller 12 from the deadlock prevention mode to the standby operation mode. In this case, both the AC power supply grid 5 and the photovoltaic generator 2 are not available to supply energy to the energy supply unit 10, and thus the energy supply unit 10 is discharged to the SoC level L3.

In case, when the AC power supply grid is again available, the grid 5 will supply energy to the inverter 3. The inverter 3, in turn, now transmits the permission to operate PTO signal to the module level devices MLDs of the photovoltaic generator. This leads to the reconnection of the photovoltaic generator 2 with the inverter 3. Now, the photovoltaic generator 2 will also be able to supply energy to the inverter 3, thereby charging the energy supply unit 10. Once the SoC level of the battery is above the SoC level L1, then the energy supply unit 10 is switched by the controller 12 from the standby prevention mode to the normal operation mode.

When the AC power supply grid 5 is available and the energy supply unit 10 is discharged to SoC level L3, then the energy supply unit 10 is switched by the controller 12 from the normal prevention mode to the standby operation mode.

FIG. 4 illustrates different state of charge SoC levels for the energy supply unit 10 of the photovoltaic system 1 shown in FIG. 1. At SoC 100%, the energy supply unit 10 is fully loaded. As long as the SoC of the energy supply unit 10 is above the first SoC level L1, it operates in a normal operation mode (Mode 0), where the inverter 3 receives energy from the photovoltaic generator 2 and/or from the AC power supply grid 5 and where the energy supply unit 10 can be used to supply energy to the local load network 13. The energy supply unit 10 receives energy from the photovoltaic generator 2 and/or from the power supply grid 5 to maintain its state of charge SoC above the first SoC level L1. A hysteresis can be provided when the power supply grid 5 is connected.

When the AC power supply grid 5 is disconnected from the inverter 3, the energy supply unit 10 is operated in a backup operation mode (Mode 1). During the backup operation mode, the energy supply unit 10 supplies the local load network 13 with a predefined amount of energy. The energy supply unit 10 is still allowed to transmit energy to the local load network 13 during the backup operation mode. The energy supply unit 10 transmits energy until its state of charge SoC reaches SoC L2.

In the backup operation mode, the energy supply unit 10 is configured to supply energy to the local load network 13 and to the inverter 3 of the photovoltaic system 1 as long as the state of charge of the energy supply unit 10 does not reach the second SoC level L2. In the backup operation mode, the inverter 3 receives energy either from the photovoltaic generator 2 and/or from the energy supply unit 10. The SoC level L1 provides a reserve capacity for a backup mode. The SoC level L2 provides a reserve capacity during the backup mode for a PLC deadlock prevention. The SoC level 2 represents a capacity of the energy supply unit 10 required to reserve energy for supplying the inverter 3 until the photovoltaic generator 2 regains sufficient energy to start to supply the inverter 3 again with energy.

In the deadlock prevention mode (Mode 2), the inverter 3 receives energy only from the energy supply unit 10, in particular, when the power supply grid 5 and the photovoltaic generator 2 are disconnected from the inverter 3 by means of the switches 4, 11.

In the deadlock prevention mode, the inverter 3 and its integrated components, in particular, the base station 6, can draw energy from the energy supply unit 10 as long as the state of charge SoC of the energy supply unit 10 is between the first SoC level L1 and the second SoC level L2. The inverter 3 draws energy from the energy supply unit 10 until the photovoltaic generator 2 regains sufficient energy and starts to supply the generated energy to the inverter 3. For example, during night, the inverter 3 does not receive energy from the photovoltaic generator 2 and if the AC power supply grid 5 is disconnected, the energy supply unit 10 operates in the deadlock prevention mode 2. The energy supply unit 10 is not allowed in this situation to transmit energy to the local load network 13.

In the deadlock prevention mode 2, the energy supply unit 10 supplies the energy between the SoC level L2 and the SoC level L3 to the inverter 3 if the inverter 3 does not receive energy from the photovoltaic generator 2 and the photovoltaic grid 5 for a predefined time period. The energy supply unit 10 of the photovoltaic system 1 is configured to exclusively supply the inverter 3 with energy in the deadlock prevention mode 2 between SoC level L2 and SoC level L3 if the inverter 3 does neither receive energy from the photovoltaic generator 2 nor from the AC power supply grid 5 for a predefined period of time. The predefined period of time can be stored in a possible implementation in a register of the controller 12. In a possible embodiment, the predefined period of time can be adjusted and adapted to a specific use case, e.g. via a user interface or a control interface of the controller 12.

In an alternative embodiment, the energy supply unit 10 of the system 1 can be configured to exclusively supply the inverter 3 with energy in the deadlock prevention mode 2 of the energy supply unit 10 if the inverter 3 does not receive a predefined amount of energy from the photovoltaic generator 2 or from the AC power supply grid 5. In a possible implementation, a predefined amount of energy can also be specified in a register accessible to the controller 12 of the photovoltaic system 1.

If the state of charge SoC falls further, it may reach a predefined minimum third SoC level L3 which may be specified by the energy supply unit manufacturer. When the SoC of the energy supply unit 10 falls below the minimum predefined third SoC level L3 and no energy is available from the AC power supply grid 5, the controller 12 switches the energy supply unit 10 in a standby operation mode (Mode 3). The SoC level L3 is the minimum state of charge SoC as defined by the manufacturer of the energy supply unit.

The SoC levels L1, L2, L3 of the energy supply unit 10 used for controlling the operation modes of the energy supply unit 10 can be stored in a possible implementation in configuration registers of the controller 12. The first SoC level L1 and the second SoC level L2 can be adjusted in a possible embodiment by means of a user interface of the photovoltaic system 1. The SoC level L3 is predefined according to the specification of the energy supply unit manufacturer.

The SoC level L2 is calculated by considering an inverter self-consumption, an energy supply unit self-consumption, a time to prevent the deadlock and a maximum capacity of the energy supply unit 10. The inverter self-consumption defines the energy consumption of the inverter 3 to be functional. The energy supply unit self-consumption defines the energy consumption of the energy supply unit 10 to be functional. The equation for calculating the SoC level L2 is as given below (Equation 1). The time to prevent the deadlock is based on an estimated unavailable or a low level of solar irradiance. The estimated unavailable or a low level of solar irradiance is based on an actual time and location of the system 1.

SoC level $L2$=SoC level $L3$+(((Inverter self-consumption+energy supply unit self-consumption)×time to prevent deadlock))/energy supply unit maximum capacity)×100  Equation 1

The second SoC level L2 is adjusted in a preferred embodiment to cover a standby energy consumption of the inverter 3 including its base station 6 for a predefined time period to prevent that the state of charge SoC of the energy supply unit 10 reaches the predefined minimum third SoC level threshold L3. In the standby operation mode 3 of the energy supply unit 10 where the inverter 3 is no longer supplied with energy from the energy supply unit 10, the inverter 3 is in a possible embodiment automatically turned off.

When the SoC level of the energy supply unit 10 reaches the minimum level SoC L3 and no AC power supply grid 5 is available, the controller 12 of the inverter 3 can activate the standby operation mode 3 so that the energy supply unit 10 opens its internal relays and the inverter 3 is no longer supplied by the energy supply unit 10 and will consequently turn off. The energy supply unit switch 11 is, thus, opened for safety reasons.

In a possible embodiment, a SoC warning signal is triggered automatically by the controller 12 when the state of charge SoC of the energy supply unit 10 reaches a predetermined level above each of the predefined SoC levels, L1, L2 or L3. The predetermined level is a SoC level of the energy supply unit 10.

In a possible embodiment, the predetermined level is a same percentage of SoC above each SoC levels, L1, L2 and L3. In another possible embodiment, the predetermined level corresponding to each of the SoC levels, L1, L2 and L3 is different. In another possible embodiment, the predetermined level for each SoC levels, L1, L2 and L3 is equal to the corresponding SoC levels, L1, L2 and L3.

In a possible embodiment, the predetermined SoC level for each of the SoC levels L1, L2, L3 of the energy supply unit 10 used for issuing the warning signal are stored in corresponding configuration registers of the controller.

In an example, a SoC warning signal can be triggered by the controller 12 when the state of charge SoC of the energy supply unit 10 reaches the predefined minimum third SoC level L3. A user-defined SoC warning level can be set up to get a notification that a low SoC level L3 has been reached.

When the state of charge SoC of the energy supply unit 10 reaches the minimum SoC level L3 and the AC power supply grid 5 is available, the controller 12 of the inverter 3 can activate the standby operation mode.

When the state of charge SoC of the energy supply unit 10 reaches the absolute minimum as defined by the manufacturer, i.e. SoC level L3, and no AC power supply grid 5 is available, the energy supply unit 10 is operated in the standby operation mode and will discharge itself until it can be recharged again from the AC power supply grid 5 (or in a worst case will get deeply discharged). When the SoC level L3 is reached and the AC power supply grid 5 is available, the energy supply unit 10 can be recharged from the AC power supply grid with a hysteresis.

The controller 12 can communicate with a control logic of the energy supply unit 10 via an energy supply unit interface. The controller 12 of the inverter 3 can get information about the current energy supply unit operating state and its state of charge SoC, as well as other energy supply unit parameters from the energy supply unit 10. Further, it is also able to set some of the energy supply unit states (e.g. the standby operation mode). The controller 12 of the inverter 3 can implement an energy supply unit management which sets the energy supply unit operating states depending on the current state of charge SoC of the energy supply unit 10, and depending on an observed state of the power supply grid 5 and a configuration of the backup mode.

FIG. 2 shows a further block diagram for illustrating the operation of a photovoltaic system 1 according to the present invention. As can be seen in FIG. 2, the base station 6 of the inverter 3 is connected by means of power cables 9 with the module level devices 7 of the photovoltaic generator 2. The module level devices 7 are provided to monitor and/or to control associated photovoltaic modules 8 as illustrated in FIG. 1. The number of module level devices 7 coupled to the DC power network can vary depending on the use case.

In the illustrated embodiment of FIG. 2, four module level devices 7-1 to 7-4 are coupled to the DC power network or DC loop comprising the base station 6 of the inverter 3. Each module level device 7 can comprise in a possible embodiment a module level monitoring, MLM, transmitter MLM-TX and a rapid shutdown, RSD, and receiver RSD-RX. The base station 6 also comprises in a possible embodiment a transmitter and a rapid shutdown receiver.

In a possible embodiment, the base station 6 is integrated in the inverter 3. The transmitter of the base station 6 can be adapted to transmit rapid shutdown RSD control signals in predefined time slots in a downlink channel DL-CH via the power cables 9 to the module level devices 7. The base station receiver of the base station 6 can be adapted to receive monitoring signals generated by the module level devices 7 through the power cables 9 within time slots via an uplink channel UL-CH assigned to the module level devices 7.

Each module level device 7 can be adapted to monitor physical parameters of the associated photovoltaic modules 8. These physical parameters can include an electrical current, a voltage, a temperature and/or an energy produced by the respective photovoltaic module 8-i. The parameters can be notified to a control unit and/or to the base station 6 by means of communication signals. In a possible embodiment, a signal amplitude of a communication signal transmitted by a transceiver via an associated duplexer circuit can be adjusted automatically depending on a monitored impedance of the respective photovoltaic generator 2.

The number of photovoltaic modules 8-i integrated in the photovoltaic generator 2 can vary depending on the use case. In the embodiment illustrated in the state diagram of FIG. 3, the energy supply unit 10 can be operated in four different operation modes under the control of the controller 12. The operation modes can comprise associated SoC ranges of the energy supply unit 10.

In the illustrated embodiment of FIG. 1, the controller 12 is provided at the inverter 3. In a further possible embodiment, a remote controller 12 can be implemented and connected to the photovoltaic system 1 via a data network. Further embodiments are possible. For example, the photovoltaic system 1 may comprise more than one energy supply unit 10 with associated energy supply unit switching devices 11.

The embodiments of the photovoltaic system 1 according to the present invention as illustrated in FIG. 1 to FIG. 4 are only exemplary and are not intended to limit the scope of the present invention.

The invention claimed is:

1. A photovoltaic system comprising:
an inverter adapted to convert a DC power supplied by photovoltaic modules of a photovoltaic generator via power cables to said inverter into an AC current for an AC power supply grid,
wherein the inverter has a base station connected by means of the power cables to module level devices which are provided to monitor and/or to control associated photovoltaic modules of the photovoltaic generator,
wherein if the inverter does not receive sufficient energy from the photovoltaic generator and the AC power supply grid, a controller is adapted to activate a deadlock prevention mode of an energy supply unit connected to the inverter where the inverter receives energy from the energy supply unit such that the base station of the inverter is able to continue to transmit permission to operate (PTO) signals via the power cables to the module level devices of the photovoltaic generator,
wherein the energy supply unit photovoltaic system can be switched by the controller into different operation modes, and
wherein the energy supply unit is configured to use state of charge (SoC) levels for controlling the different operation modes of the energy supply unit, and the SoC levels are stored in configuration registers of the controller.

2. The photovoltaic system according to claim 1 wherein the different operation modes comprise:
a normal operation mode where the energy supply unit is configured to supply energy to a load network of the photovoltaic system and to receive energy from the photovoltaic generator or from the AC power supply grid to maintain the SoC of the energy supply unit above a predefined first SoC level, L1,
a backup operation mode where the energy supply unit is configured to supply energy to the load network of the photovoltaic system via the inverter until the SoC reaches a predefined second SoC level, L2, when the AC power supply grid is disconnected,
a deadlock prevention mode where the energy supply unit is configured to supply exclusively the inverter of the photovoltaic system with energy when the SoC of the energy supply unit falls below the second SoC level, L2, and no energy from the AC power supply grid is available, and a standby operation mode where the inverter of the photovoltaic system is no longer supplied with energy from the energy supply unit of the photovoltaic system when the SoC of the energy supply unit falls below a predefined third SoC level, L3, and no energy from the AC power supply grid is available.

3. The photovoltaic system according to claim 1 wherein the energy supply unit of the photovoltaic system is configured to exclusively supply the inverter of the photovoltaic system with energy in the deadlock prevention mode of the energy supply unit if the inverter does not receive energy from the photovoltaic generator and the AC power supply grid for a predefined period of time.

4. The photovoltaic system according to claim 1 wherein the energy supply unit of the photovoltaic system is configured to exclusively supply the inverter of the photovoltaic system with energy in the deadlock prevention mode of the energy supply unit if the inverter does not receive a predefined amount of energy from the photovoltaic generator and the AC power supply grid.

5. The photovoltaic system according to claim 1 wherein in the standby operation mode of the energy supply unit where the inverter of the photovoltaic system is no longer supplied with energy from the energy supply unit, the inverter is automatically turned off.

6. The photovoltaic system according to claim 1 wherein a SoC warning signal is triggered by the controller when SoC of the energy supply unit reaches a predetermined level above each of the predefined SoC levels, L1, L2 or L3.

7. The photovoltaic system according to claim 1 wherein the controller comprises a first interface to receive information about the current operation mode of the energy supply unit and about operation parameters including the SoC of the energy supply unit and a switching state of an energy supply unit switch which is provided between the energy supply unit and the inverter.

8. The photovoltaic system according to claim 1 wherein the controller comprises a second interface to receive information about the current state of the AC power supply grid including the switching state of a grid switch which is provided between the AC output of the inverter and the AC power supply grid.

9. The photovoltaic system according to claim 2 wherein the first SoC level, L1, and the second SoC level, L2, are adjustable by means of a user interface and wherein the SoC level, L3, is predefined according to a specification of the energy supply unit manufacturer.

10. The photovoltaic system according to claim 9 wherein the second SoC level, L2, is adjusted to cover a standby energy consumption of the inverter including its base station and an energy supply unit self-consumption for a predefined time period to prevent the SoC, of the energy supply unit to fall below the predefined third SoC level, L3.

11. A method for operating a photovoltaic system comprising an inverter which has a base station connected by means of power cables to module level devices of a photovoltaic generator, the method comprising steps of:

supplying, by photovoltaic modules of the photovoltaic generator via the power cables, a DC power to said inverter;

converting, by the inverter, the supplied power into an AC current supplied to an AC power supply grid;

monitoring and/or controlling, by the module level devices of the photovoltaic generator, associated photovoltaic modules of the photovoltaic generator;

activating, by a controller of the photovoltaic system, if the inverter does not receive sufficient energy from the photovoltaic generator and the AC power supply grid, a deadlock prevention mode of an energy supply unit connected to the inverter in which the inverter receives energy from the energy supply unit such that the base station of the inverter is able to continue to transmit permission to operate (PTO) signals via the power cables to the module level devices of the photovoltaic generator;

switching, by the controller, the energy supply unit of the photovoltaic system into different operation modes; and storing state of charge (SoC) levels which are used by the energy supply unit for controlling the operation modes of the energy supply unit, in configuration registers of the controller.

12. The method according to claim 11, further comprising:

supplying, by the energy supply unit of the photovoltaic system, the inverter of the photovoltaic system with energy in the deadlock prevention mode of the energy supply unit exclusively if the inverter does not receive energy from the photovoltaic generator and the AC power supply grid for a predefined period of time.

13. The method according to claim 12, further comprising:

supplying, by the energy supply unit of the photovoltaic system, the inverter with energy in the deadlock prevention mode of the energy supply unit exclusively if the inverter does not receive a predefined amount of energy from the photovoltaic generator and the AC power supply grid.

14. The method according to claim 11, further comprising:

triggering a SoC warning signal automatically if the SoC of the energy supply unit reaches a predetermined level above a corresponding one of three predefined SoC levels, L1, L2 or L3.

15. The method according to claim 14, wherein the predetermined level is a same percentage of SoC above each of the predefined SoC levels, L1, L2 and L3.

16. The method according to claim 14, wherein the predetermined level is different for each of the predefined SoC levels, L1, L2 and L3.

17. The method according to claim 14, wherein the predetermined level for each of the predetermined SoC levels, L1, L2 and L3 is equal to the corresponding SoC level, L1, L2 and L3.

* * * * *